3,790,669
SYNERGISTIC TYLOSIN AND FURAZOLIDONE MEDICATION FOR CALF PNEUMOENTERITIS COMPLEX
Charles Gale, Indianapolis, Ind, assignor to Eli Lilly and Company, Indianapolis, Ind.
No Drawing. Filed Sept. 11, 1972, Ser. No. 288,226
Int. Cl. A61k 21/00
U.S. Cl. 424—120                    10 Claims

ABSTRACT OF THE DISCLOSURE

Administration of a synergistic combination of tylosin and furazolidone prevents and treats pneumoenteritis complex disease of calves. Oral administration is particularly preferred. Novel feed compositions containing my combination are effective in my method of controlling pneumoenteritis complex disease.

BACKGROUND OF THE INVENTION

Many young calves are lost to the serious disease which is commonly called pneumoenteritis complex. The disease attacks calves which are less than approximately 12 weeks of age, and primarily attacks calves which are still consuming milk or artificial milk.

Pneumoenteritis complex is not a well-defined disease. It is a complex of respiratory and enteric signs which are caused by a number of microorganisms. Respiratory signs usually take the form of pneumonia; the usual enteric sign is diarrhea, or scours. Salmonella, pasteurella, pseudomonas, and other species are involved in respiratory signs of pneumoenteritis complex. Salmonella species and *Escherichia coli* are involved in the enteric aspect of pneumoenteritis complex.

In the United States, from 10 to 20 percent of calves are routinely lost to pneumoenteritis complex. The manner in which calves are reared has a strong effect on the probability of serious loss from pneumoenteritis complex.

It is known that calves raised by the cow's side are less likely to be seriously ill from pneumoenteritis complex than are calves which are separated from the dam. It is proven that calves which are left with the dam for long enough to receive the dam's colostrum are less likely to be attacked by pneumoenteritis complex. However, modern culture of calves, and particularly of dairy calves, calls for calves to be removed from the dam very soon after birth in the interests of economical milk production.

At the present time, a number of methods of prophylaxis and treatment of calf pneumoenteritis complex are in fairly wide use. The frequent movement of calves from one set of quarters to another is helpful. Very often the milk substitute which is fed to calves removed from the dam is medicated with an antibiotic or a combination of antibiotics. Neomycin is used, as are the nitrofurans and the tetracyclines. Tylosin is also used. One of the most effective antibiotics against the salmonella-caused symptoms of calf pneumoenteritis complex is chloramphenicol, which is not acceptable in the United States because of its toxicity and side effects.

Tylosin is now a well-known agricultural antibiotic drug. It was first disclosed in Hamill et al., U.S. Pat. 3,178,341, which taught the production of tylosin by fermentation with microorganisms identified as NRRL 2702 and NRRL 2703 which are obtainable from the Northern Utilization Research and Development Branch, U.S. Department of Agriculture, Peoria, Illinois. Tylosin is well known to be effective against staphylococcus, mycobacterium, klebsiella, streptococcus, and diplococcus organisms.

Furazolidone is the generic name for 3-(5-nitrofurfurylidineamino)-2-oxazolidinone. The compound was disclosed by Gever, U.S. Pat. 2,742,462. It is well known that furazolidone, a member of the large and important family of nitrofuran antimicrobial drugs, is effective against salmonella and pasteurella species, and against *E. coli*.

SUMMARY

A synergistic combination of tylosin and furazolidone is effective in the prevention and treatment of calf pneumoenteritis complex disease. The combination is effective at rates from about 250 to about 500 mg./calf/day of tylosin and about 100 mg./calf/day of furazolidone. Novel feed compositions containing my synergistic combination of drugs are also disclosed.

DESCRIPTION OF THE PREFERRED EMBODIMENT

My invention is a method of preventing or treating pneumoenteritis complex disease of calves which comprises the administration of tylosin and furazolidone to the calves. My method is effective in calves from birth to about the age of 12 weeks. The preferred rates of administration are from about 250 mg./calf/day to about 500 mg./calf/day of tylosin and about 100 mg./calf/day of furazolidone. Oral administration of my combination of drugs is preferred. The preferred method of administration is in the calves' feed and especially in liquid feeds such as milk replacers.

I have further invented new calf feed compositions which comprise in their preferred embodiment from about 250 parts to about 500 parts of tylosin, about 100 parts of furazolidone, and a calf feed. The preferred calf feed portions of the compositions of my invention comprise liquid calf feeds such as milk replacer.

Administration of my synergistic combination both prevents and treats pneumoenteritis complex disease of calves. Pneumoenteritis complex is likely to afflict calves of any age from birth to about 12 weeks of age. My synergistic combination may be administered effectively to calves at any time within that range for either the prevention or the treatment of pneumoenteritis complex disease.

Administration of my drug combination may be begun when signs of pneumoenteritis complex appear in the calves. Since the disease rapidly ravages calves, treatment should be started promptly for best effect.

Very frequently pneumoenteritis complex will break out in a calf within a few hours after birth. In order to positively prevent such outbreaks, it is practical to begin administration of my synergistic combination immediately after birth. It is somewhat difficult to distinguish between prevention and treatment of pneumoenteritis complex in very young calves, because the calves are so often afflicted with pneumoenteritis complex disease. An administration of my drugs which is though to be a preventive one may in fact be a treatment of disease which has not yet frankly broken out.

It is practical to begin preventive administration of my synergistic combination a short time before an expected outbreak, when experience with the herd or with the premises suggest particular times when outbreaks of pneumoenteritis complex are to be expected. In general, outbreaks of pneumoenteritis complex are likely to occur when the calves' dams have been under stress while pregnant, when adverse weather or other conditions put unusual stress on the calves, and when the calves are weakened by other infections.

After an outbreak of pneuomenteritis complex in a calf herd has been controlled by treatment with my combination of drugs, the grower may beneficially continue to administer my synergistic combination as a preventive against a recurrence of the disease either in individual calves or in the herd at large.

The preferred way to use my method comprises the administration of from about 250 mg./calf/day to about 500 mg./calf/day of tylosin and about 100 mg./calf/day of furazolidone to calves of about 12 weeks of age or less.

Another method of carrying out my invention comprises the administration of from about 50 to about 1,000 mg./calf/day of tylosin and from about 5 to about 250 mg./calf/day of furazolidone for a period of from about 2 to about 12 weeks. Prevention or treatment of pneumoenteritis complex disease may be accomplished within the scope of my invention when such an administration is carried out at any time within the calves' lives from birth to about 12 weeks of age.

Another method of practicing my invention comprises the administration of from about 250 to about 1,000 mg./calf/day of tylosin and from about 50 to about 500 mg./calf/day of furazolidone for a period of from about 2 to about 14 days. Since pneumoneteritis complex disease very often afflicts calves soon after their birth, the embodiment of my invention in which my synergistic combination of drugs is administered for from about 2 to about 14 days is most effectively begun quite soon after the calves' birth. However, administration may be performed at any time before the calves are about 12 weeks old.

The most economical way to administer my combination of drugs to calves is by mixing the drugs in the calves' feed. Calves less than 12 weeks of age are fed at least in part on liquid diets. Often, dry feeds are offered to calves beginning at 6 or 8 weeks of age, but a liquid diet is used to supply at least part of the calves' nutritive needs until they are about 12 weeks of age. The liquid feeds which calves receive are usually milk replacers, although skimmed milk, buttermilk, and even whole milk may be fed to calves. A milk replacer is a water-dispersed mixture of nutritive materials which are beneficial to calves. It comprises a water-based suspension of substances such as skim milk solids, salts, sugar, oil, meat by-product, and vitamins, which substances are supplied to the grower as a powdered concentrate. Milk replacers are further discussed below.

The preferred novel calf feed composition which provides my synergistic drug combination comprises a mixture of from about 250 to about 500 parts of tylosin, about 100 parts of furazolidone, and a suitable calf feed which provides the animals' nutritive needs. The preferred calf feed portions of my feed compositions comprise liquid calf feeds, and particularly calf milk replacers.

Those skilled in the art will recognize that another useful calf feed combination comprises a mixture of from about 50 to about 1,000 parts of tylosin and from about 5 to about 500 parts of furazolidone combined with an appropriate calf feed.

Furazolidone is a member of the large family of nitrofuran antimicrobial drugs. The family consists of many useful chemicals which have much the same biological properties. It will be understood by those skilled in the veterinary medical art that other members of the nitrofuran family will be equivalent in their usefulness to furazolidone in my combination.

Other exemplary members of the nitrofuran family are the following compounds:

furaltadone, 5-morpholinomethyl-3-(5-nitrofurfurylidene-amino)-2-oxazolidinone
nitrofurazone, 5-nitro-2-furaldehyde semicarbazone
nifuroxime, 5-nitro-2-furaldoxime
furaspore, 5-nitro-2-furfuryl methyl ether
nitrofurantoin, N-(5-nitro-2-furfurylidene)-1-amino-hydantoin
nifuraldezone, 5-nitro-2-furaldehyde semioxamazone
nifuratel, 5-[(methylthio)methyl]-3-[(5-nitrofurfurylidene)-amino]-2-oxazolidinone.

Tylosin is effective in my method in the base form and as salts. Such nontoxic acid addition salts, as is usual with the salts of antibiotics, can be used as well as the base compound for the practice of my method. It seems probable that the animal to which tylosin is given degrades the acid addition salt to form the base compound. Whatever the mechanism, it is well known that acid addition salts of antibiotics are effective for treatment of animals. For example, suitable salts can be formed by reacting the base compound with acids such as sulfuric acid, nitric acid, phosphoric acid, metaphosphoric acid, tartaric acid, methylsulfonic acid, acetic acid, propionic acid, butyric acid, nitrous acid, sulfurous acid, hydrochloric acid, hydrobromic acid, hyposulfurous acid, benzoic acid, and lauryl sulfuric acid. In this application, the term tylosin will be used to include tylosin and its physiologically-acceptable salts.

In order to prove the unexpected activity of my method of preventing pneumoenteritis complex in calves, I conducted tests in the following manner. The calves which were used in the tests of Examples 1–6 were all Holstein dairy calves gathered from dairy herds in the midwestern United States. All calves used in these tests were between 1 and 7 days old when they were received at my laboratory and had been taken from their mothers soon after birth.

Calves were received in batches. As soon as each batch of calves arrived, the calves were individually weighed and allocated into test groups of about 8 calves each. Calves were placed in test groups in such a manner that the average weight of the groups was as close as possible to identical. The several 8-calf groups in each batch of calves were used in a single test.

Each test group was placed in a pen in an enclosed but unheated building. The pens had concrete floors and were divided from the adjacent pens by a solid concrete wall. Between tests, the pens were thoroughly washed down with soap, water and brushes, and the walls and floor were brushed with a creosote emulsion to disinfect them.

During each test, which was usually 6 weeks but could be as long as 12 weeks, the calves were kept under constant surveillance in order to detect signs of either respiratory illness or of scours as quickly as such signs appeared. The pens were regularly scraped out and the bedding changed to keep the floors as clean as practical.

The calves were fed during the tests on milk replacer. Batches of milk replacer were made twice daily in a 25-gallon enameled steel vessel, which was thoroughly washed after making each batch. Milk replacer was fed to the calves from half-gallon nursing bottles with nipples. The ear-tagged calves were placed in individual stalls for feeding, so that it was positively known that each calf fed only from its own bottle. By this means, also, I was able to assure that all calves got the same amount of milk replacer.

The milk replacer concentrate, from which the calves' milk replacer was made by dispersion of the concentrate in water, had the following formula.

|  | Percent |
| --- | --- |
| Dried skim milk | 67.40 |
| Salt | 0.50 |
| Sodium phosphate | 1.50 |
| Dextrose | 2.50 |
| Starch powder | 4.99 |
| Polysorbate 80 | 2.00 |
| Corn oil | 10.98 |
| Beef tallow | 8.99 |
| Trace mineral premix [1] | 0.10 |
| Vitamin A and $D_2$ premix [2] | 0.40 |
| Vitamin E | 0.12 |
| Vitamin premix [3] | 0.50 |
| Ferrous sulfate (20%) | 0.02 |
| Ascorbic acid—72 g./ton | |
| Total | 100.00 |

[1] Trace mineral premix contains: 2.50% manganese as manganous oxide, 0.07% iodine as potassium iodide, 0.30% cobalt as cobalt carbonate, 0.50% copper as copper oxide, and 20.00% zinc as zinc sulfate.
[2] Each pound contains 2,000,000 USP units vitamin A and 227,200 USP units vitamin $D_2$.
[3] Each kg. of premix contains the following: 77,161 USP units vitamin $D_2$; 440.0 mg. riboflavin; 2,240.6 mg. niacin; 1,602.4 mg. pantothenic acid; 19,180 mg. choline and 4.4 mg. vitamin $B_{12}$.

The tylosin, furazolidone, or the combination of tylosin and furazolidone was carefully measured into the individual nursing bottles. Tylosin was in the form of the tartrate salt. Each drug was dissolved in an edible solvent and pipetted into the nursing bottles. In this way, I could assure that each calf got a uniform dose of the drugs which were assigned to it.

Successive groups of test calves were placed in the same pens, which were cleaned between tests as described above. I did not observe a consistent increase in the severity of infection as the series of tests proceeded. I did observe a large variation in the severity of pneumoenteritis complex from test to test. The variation in degree of infection is typical of pneumoenteritis complex disease.

It should be emphasized that the calves in the tests of these examples were not artifically challenged. They were handled in quarters which were kept as clean as is practical in large scale cattle culture. The infections from which they suffered were contracted from the quarters or were imported into the tests with the calves, all of which came from supposedly healthy dairy herds. The high incidence of pneumoenteritis complex which afflicted these calves is symptomatic of the severe problem with which calf raisers contend.

It perhaps should be noted that the death rate experienced by the control calves in these tests is higher than that experienced in a typical calf herd. Typically, individual calves are massively dosed with appropriate drugs for the control of signs experienced by the calf. Such therapy was not administered to the calves in my tests. The purpose of the tests was to show the control of pneumoenteritis complex which could be obtained with no medication other than medication with my combination of tylosin and furazolidone. My tests illustrate a remarkable improvement both in the survival rate of calves, and in the weight gains achieved by the surviving calves.

The examples which follow show the details of the tests which I have conducted and the results of them.

EXAMPLE 1

This test began in mid-December and ran for 6 weeks. The 32 calves were divided into four test groups, which were fed, respectively, no medication, 250 mg./calf/day of tylosin, 100 mg./calf/day of furazolidone, and a combination of 250 mg./calf/day of tylosin and 100 mg./calf/day of furazolidone. The results of the test were analyzed as the survival rate through the 6-week test, and the weight gain of the calves which survived the entire 6-week period. No weight gain data was considered for the animals which did not survive through the 6-week period, although weights of the animals were taken each week.

|  | Starting calves | Deaths | Survival rate, percent | Mean weight gain of survivors, lb. |
| --- | --- | --- | --- | --- |
| Control | 8 | 3 | 62.5 | 23.2 |
| Tylosin | 8 | 6 | 25 | 37.0 |
| Furazolidone | 8 | 4 | 50 | 13.5 |
| Tylosin and furazolidone | 8 | 1 | 87.5 | 31.9 |

This data clearly demonstrates the synergistic efficacy of my method of treating pneumoenteritis complex. The benefit is particularly noticeable in the substantial increase in survival of the calves. The benefit in weight gain is also easily recognized, particularly in view of the very poor performance of the calves on the furazolidone control treatment.

EXAMPLE 2

This test began in early February and ran for 6 weeks. Except that I was unable to obtain 8 calves for each test group, the test was identical to the test of Example 1.

|  | Starting calves | Deaths | Survival rate, percent | Mean weight gain of survivors, lb. |
| --- | --- | --- | --- | --- |
| Control | 6 | 5 | 16.7 | 27 |
| Tylosin | 7 | 6 | 14.3 | 32 |
| Furazolidone | 7 | 4 | 42.9 | 45.3 |
| Tylosin and furazolidone | 7 | 3 | 57.1 | 40.5 |

The challenge in this test was particularly severe, as shown by the very low survival rate of the control calves. The survival of the calves which received my synergistic combination clearly shows the benefit of the treatment. Since the the surviving calves which received the two drugs alone gained weight quite well, the weight gains of the calves which received the combination do not stand out in this test.

EXAMPLE

This test began in early March and ran for 6 weeks. The conditions were identical to the conditions of the tests of Example 1 and Example 2, except for the change in weather.

|  | Starting calves | Deaths | Survival rate, percent | Mean weight gain of survivors, lb. |
| --- | --- | --- | --- | --- |
| Control | 7 | 5 | 28.6 | 33.5 |
| Tylosin | 8 | 2 | 75 | 26.8 |
| Furazolidone | 8 | 3 | 6.25 | 22.6 |
| Tylosin and furazolidone | 8 | 3 | 62.5 | 38.2 |

The challenge in this test was somewhat less severe than was the challeneg in Test 2. It should be kept in mind that the weight gain of the survivors of the control group is frequently quite high because those survivors necessarily are exceptionally sturdy calves. Weight gains of the calves which receive the individual drugs alone are often relatively low because they represent weak calves which have been kept alive though in poor health. In contrast, the good weight gains of the calves which received my synergistic combination reffect the weak calves which have been not only kept alive but have been able to make good weight gains.

EXAMPLE 4

This test began in early June and ran for 12 weeks. Data was analyzed at the 6-week and 12-week points of the test. Test conditions were identical to the conditions of the tests of the first three examples.

|  | | 6-week | | | 12-week | |
| --- | --- | --- | --- | --- | --- | --- |
|  | Starting calves | Deaths | Survival rate, percent | Mean weight gain of survivors, lb. | Deaths | Survival rate, percent | Mean weight gain of survivors, lb. |
| Control | 8 | 4 | 50 | 31.5 | 4 | 50 | 82.2 |
| Tylosin | 8 | 1 | 87.5 | 33.7 | 2 | 75 | 95.5 |
| Furazolidone | 8 | 2 | 75 | 39.5 | 3 | 62.5 | 99.8 |
| Tylosin and furazolidone | 8 | 0 | 100 | 48.2 | 1 | 87.5 | 115 |

The challenge here was a relatively mild one. The individual drugs provided small benefits to the treated calves. My synergistic combination clearly provided benefits much superior to the benefits of the individual drugs.

The calves which died during all the tests which have been described above were autopsied, and many of the calves which survived through the full period of the test were sacrificed and autopsied. Most of the calves which died were diagnosed as being ill with both pneumonia and enteritis. The lungs were 50 percent to 90 percent full of liquids and pneumonial deposits. The digestive tract was usually severely enteritic and hemorrhagic, frequently in both the large and small intestines.

Since the tests which were described in Examples 1 through 4 were performed under comparable conditions and with calves from comparable sources, it is believed valid to pool the data derived from these four tests. The pooled data is listed below.

|  | Starting calves | 6-week deaths | Survival rate, percent | Mean weight gain of survivors, lb. |
| --- | --- | --- | --- | --- |
| Control | 29 | 17 | 41.3 | 28.0 |
| Tylosin | 31 | 15 | 51.5 | 31.0 |
| Furazolidone | 31 | 13 | 58.0 | 30 |
| Tylosin and furazolidone | 31 | 7 | 77.4 | 40.0 |

The pooled data from Examples 1 through 4 is much more enlightening than is the data from the individual tests considered alone. It is very clearly seen that each of the individual drugs provides a benefit in both survival rate and in weight gain of the surviving calves. It is also clearly demonstrated that the synergistic combination provides benefits in both survival rate and weight gain which are substantially greater than the benefits of either drug alone. When the data is pooled, the wide swings in performance within the individual tests, each of which included only a small number of calves, are smoothed out, and the true quality of my method is made clear.

The tests which are reported in Examples 5 and 6 were conducted on a different experimental design. A wider range of furazolidone rates was used. The number of furazolidone rates used precluded provision of positive controls for each rate of furazolidone in the combination treatments. The test conditions, other than the rates of drugs administered, were identical to the conditions of the first four examples.

EXAMPLE 5

This test began in early September and ran for 5 weeks. The treatment rates and the results are tabulated below.

| Daily drugs/calf | Starting calves | 5-week deaths | Survival rate, percent | Mean weight gain of survivors, lb. |
| --- | --- | --- | --- | --- |
| Control | 8 | 8 | 0 | 0 |
| 250 mg. tylosin | 8 | 7 | 12.5 | [1]—8.0 |
| 5 mg furazolidone and 250 mg. tylosin | 8 | 4 | 50 | [1]—3.2 |
| 25 mg. furazolidone and 250 mg. tylosin | 8 | 6 | 25 | 7.5 |
| 100 mg. furazolidone and 250 mg. tylosin | 8 | 5 | 37.5 | 3.0 |

[1] Loss.

It will be recognized that, perhaps because of the hot humid weather in which this group of tests was conducted, the level of infection of the calves was much higher in this test than in the previous tests.

The challenge in the test of Example 5 was exceptionally severe. Nevertheless, the benefit of my combination treatments is shown by the improved survival rate of the calves which received the combination treatments.

EXAMPLE 6

The conditions of this test are similar to the conditions of the test reported in Example 5. This test however ran for 8 weeks.

|  | | 8 week | | |
| --- | --- | --- | --- | --- |
| Daily drugs/calf | Starting calves | Deaths | Survival rate, percent | Mean weight gain of survivors, lb. |
| Control | 8 | 5 | 37.5 | 37.3 |
| 250 mg. tylosin | 8 | 3 | 62.5 | 25.4 |
| 5 mg. furazolidone and 250 mg. tylosin | 8 | 4 | 50 | 51.5 |
| 25 mg. furazolidone and 250 mg. tylosin | 8 | 3 | 62.5 | 39 |
| 100 mg. furazolidone and 250 mg. tylosin | 8 | 5 | 37.5 | 40 |

In this test, the infection rate was much lower than in the test immediately preceding. However, the infection rate and the death rate of the control calves was comparable to that experienced in most of our tests.

The data tabulated above again shows the efficacy of my combination of drugs.

EXAMPLE 7

A large test was performed at a calf nursery in Spain which continually rears large numbers of calves for the veal market. A group of 96 Holstein calves of a few days of age was assembled. The calves were divided into four groups of approximately equal average weight, which were medicated in the following manner.

One group received no medication and served as a control.

One group received 100 mg. of furazolidone per calf per day.

One group received 500 mg. tylosin tartrate per calf per day.

One group received 100 mg. furazolidone and 500 mg. of tylosin tartrate per calf per day.

In this test, medication was administered for only 10 days at the beginning of the calves' residence in the nursery. This test is to be contrasted with the tests in Examples 1 through 6, wherein the medication was administered for the full period of the test.

The calves received a milk replacer diet. Since the number of calves receiving a given medication was fairly large, the medication was mixed directly into batches of milk replacer which were mixed in a tank. The milk replacer tank was very carefully cleaned after mixing each treatment group's batch of milk replacer.

The milk replacer was a commercial product. The dry concentrate from which the milk replacer was mixed by dispersing the concentrate in water had the following analysis.

| | | |
|---|---|---|
| Gross protein | percent | 23 |
| Fiber | do | 0.6 |
| Fat | do | 17.5 |
| Carbohydrates | do | 39.5 |
| Minerals | Maximum percent | 8 |
| Vitamin A | I.U./kg | 35,500 |
| Vitamin $D_3$ | I.U./kg | 11,000 |
| Vitamin E | mg./kg | 7.5 |
| Vitamin C | mg./kg | 250 |
| Vitamin $B_1$ | mg./kg | 12 |
| Vitamin $B_{12}$ | mg./kg | 40 |
| Niacin | mg./kg | 150 |
| Riboflavin | mg./kg | 20 |
| Folic acid | mg./kg | 500 |
| Calcium pantothenate | mg./kg | 20 |

The calves in this test were housed in a heated, well-ventilated building. Each calf had an individual pen, which was floored with a wooden grating for cleanliness. Thus, the calves in this test were more carefully housed and cared for than those in the tests of Examples 1–6. The careful handling of these calves was reflected by their survival rate. Only four calves out of the 96 died during the period of the test, all of them from pneumoenteritis. Those deaths all were in the control group.

Since the survival rate in these tests was so high, only the weight gain and feed conversion data developed during the tests is meaningful.

| | Starting calves | 8 week—mean weight gain, kg. | 15 week Mean weight gain, kg. | Mean daily gain, kg. | Conversion, kg. grain/kg. feed |
|---|---|---|---|---|---|
| Control | 24 | 45.0 | 104.7 | .997 | 0.615 |
| Tylosin | 24 | 41.7 | 98.2 | .935 | 0.577 |
| Furazolidone | 24 | 42.5 | 102.1 | .972 | 0.602 |
| Tylosin and furazolidone | 24 | 46.2 | 107.6 | 1.025 | 0.633 |

The large numbers of calves in each test group here help to smooth out the natural biological variations in performance of individual calves, and thereby to make clear the synergistic performance of my combination.

It must be pointed out that a slight ambiguity is imparted to the test by a mild outbreak of hoof and mouth disease. Approximately equal numbers of calves in each test group exhibited symptoms of hoof and mouth disease. Additional medication of individual calves was allowed in the test of this example, because these calves were in commercial culture and the owner needed to rear the calves in order to continue his business. Individual calves were treated with streptomycin, sulfamides, seroglucose, bacitracin and neomycin when needed. Pneumonia signs were treated as required with strepto-neomycin, balsamics, neomycin disulfate, chloramphenicol, sulfadimerazine-dextrose, and biostimulants. However, these various adventitious medicaments were applied to calves of all test groups equally according to their need.

The following table illustrates the effect of my combination in another way. The table lists the number of calf-days during which signs of scours or respiratory tract ailments were observed.

| | Scours | Respiratory signs |
|---|---|---|
| Control | 98 | 47 |
| Tylosin | 102 | 49 |
| Furazolidone | 93 | 46 |
| Tylosin and furazolidone | 74 | 31 |

These observations suggest that, in this test at least, the individual drugs had no effect. In contrast, the synergistic combination clearly decreased the occurrence of both respiratory signs and scours.

In summary, the test illustrated in Example 7 is a commercial scale test and the calves were handled commercially. However, the calves in all of the four test groups were treated in identical fashion. All of the data, whether weight gain, feed conversion, or number of days in which signs of pneumoenteritis complex were observed, illustrate that the combination of tylosin and furazolidone gives a synergistic benefit to the calves treated with it.

EXAMPLE 8

A 48-calf test was performed at an Italian veal calf nursery. The calves, mostly Holsteins, arrived at the calf nursery at 4 to 10 days of age. The calves were divided into two groups of 24 calves each. The two groups of calves were fed on commercial milk replacer from their arrival at the calf nursery until they were slaughtered at 120 days. For the first 10 days of the calves' lives in the calf nursery, their milk replacer was medicated with, for one group, 100 mg./calf/day of furazolidone, and, for the other group, 1,000 mg. of tylosin tartrate and 100 mg. of furazolidone/calf/day.

The milk replacer which was given to these calves was changed from time to time during the calves' lives. For the first 15 days, the milk replacer was a brand which provided 30 percent crude proteins, 7 percent crude fats, trace minerals, 80 mg./kg. of furazolidone, 80 mg./kg. of chlortetracycline, and was very high in Vitamins A, D, E, and B complex. At the 15th day, the calves were changed over to a second milk replacer which contained 26 percent crude proteins, 16 percent crude fats, the same amounts of furazolidone and chlortetracycline, two-thirds of the amounts of Vitamins A and E contained in the first milk replacer and 80 percent of the minerals of the first milk replacer, and the same amounts of Vitamin D and B complex. At the 60th day, the calves were changed over to a third milk replacer which contained 25 percent crude proteins, 20 percent crude fats, 50 mg./kg. of furazolidone, 80 mg./kg. of chlortetracycline, no trace minerals, two-thirds of the amounts of Vitamins D and B complex in the second milk replacer, and the same amounts of Vitamins A and E as the second milk replacer.

The test started in early August. The calves were housed in individual wooden pens with wooden slat floors, inside a well-ventilated calf nursery building. Calves of the two test groups were placed in alternate pens, so that no local events within the calf nursery could affect the result of the tests.

The calves' milk replacer was mixed and the medications added in the fashion used in Example 7.

Results of this test are shown below.

|  | Starting calves | 60-day mean wt. gain, kg. | 120-day Mean wt. gain, kg. | Conversion, kg. gain/kg. feed |
|---|---|---|---|---|
| Furazolidone | 24 | 45.45 | 102.87 | 0.522 |
| Tylosin and furazolidone | 24 | 49.23 | 109.66 | 0.549 |

A few calves, 1 calf in the tylosin and furazolidone group and 4 calves in the furazolidone group, exhibited signs of severe respiratory illness. These calves were treated with chloramphenicol, tetracycline, and/or prednisolone. Nearly all of the calves in both groups developed some signs of scouring. Treatment was not given scours other than temporary reduction of diet.

The data clearly indicates the superior performance of calves fed with my combination. Calves so fed outperformed calves on furazolidone alone, both as to average weight gains per animal and as to conversion of feed into gain.

Those skilled in the animal husbandry art will understand that the synergistic benefit of my drug combination is not confined to the relatively narrow ranges of rates shown in the examples. The prevention or treatment of calf pneumoenteritis complex disease by means of the administration of rates of tylosin and of furazolidone chosen from the range from about 50 to about 1000 mg./calf/day of tylosin and from about 5 to about 500 mg./calf/day of furazolidone is equivalent to the administration illustrated in my examples.

My invention is the method of protecting calves from pneumoenteritis complex which comprises the administration of tylosin and furazolidone, and the means by which the drugs are administered to the calves are merely the means common in the animal husbandry art. In order to assist those skilled in the art in the use of my combination, some exemplification of methods of administration will be given.

My synergistic combination of drugs may be administered to calves by oral routes such as food, water, or oral dosage forms such as tablets, capsules, and drenches, or may be administered by percutaneous means such as injection. The preferred method of administration is in the calves' feed, and particularly in liquid feeds such as milk replacer.

Calves are fed with different types of liquid feeds. Most commonly, they are fed milk replacer. They are also frequently fed with waste portions of whole milk, such as buttermilk, skim milk, or with such milk fractions combined with whole milk or with milk replacer. In special instances calves may also be fed suspensions of nutritive grains in water or in milk fractions or replacer. Under special economic circumstances, calves may be fed reconstituted dried whole or fractionated milk.

As has been explained, a milk replacer is an aqueous suspension (or emulsion) of nutritive ingredients. Tylosin and furazolidone can readily be suspended along with the nutritive portions of the diet.

Milk replacer concentrates for calves often are formulated according to the following general formula.

|  | Percent |
|---|---|
| Skim milk powder | 60–80 |
| Whey powder | 2–10 |
| Animal fat | 10–30 |
| Vegetable fat | 2–10 |
| Corn starch | 2–5 |
| Soya flour | 2–7 |
| Dextrose | 0–5 |
| Lactose | 0–5 |
| Yeast | 0–3 |
| Mineral and vitamin premix | 2–5 |

Specific information on individual milk replacers is shown in the examples. A formula for one widely accepted milk replacer is the following.

|  | Percent |
|---|---|
| Skim milk powder | 72.8 |
| Animal fat | 10.0 |
| Vegetable fat | 5.0 |
| Dry yeast | 3.0 |
| Minerals | 2.0 |
| Vitamin and bacitracin premix | 2.2 |
| Dextrose | 5.0 |

The above formula produces a milk replacer product which contains 23% minimum of crude protein, 15% minimum of crude fat, 1.5% maximum of fiber, Vitamin A, Vitamin D, and Vitamin E. A trace amount of ethoxyquin is added to protect the mixture from spoilage before use.

Suitable physiologically-acceptable adjuvants are useful to keep the drugs suspended. The adjuvants can be chosen from among the thickeners, such as carboxymethylcellulose, polyvinylpyrrolidone, gelatin, and the alginates. Many classes of surfactants also serve to suspend drugs. For example, lecithin, alkylphenol polyethylene oxide adducts, naphthalenesulfonates, alkylbenzenesulfonates, and the polyoxyethylene sorbitan esters are useful for suspending drugs.

In addition many substances which affect the hydrophilicity, density, and surface tension of the liquid can assist in making suspensions in individual cases. For example, silicone anti-foams, glycols, sorbitol, and sugars are useful suspending agents.

Tylosin and furazolidone can also be mixed into liquid diets in the form of a concentrated solution. The drugs may be dissolved in any physiologically-acceptable solvent for the drugs. For example, depending on the salt of tylosin which is chosen, drugs can be dissolved in glycols such as propylene glycol or in alcohols such as ethanol.

The combination of drugs may be supplied to the calf grower combined with the milk replacer concentrate or as a combination drug concentrate. The drugs, with or without suitable suspending adjuvants, may be supplied in the dry form, as a concentrated suspension, or as a solution.

When my synergistic combination is provided to the grower in the milk replacer concentrate, frequent changes of the concentration of the drugs in the concentrate will be required because of the very rapid increase in the daily amount of milk replacer concentrate which the growing calves consume.

It is much more simple and economical to supply the combined drugs to the grower in the form of a concentrate to be added to the mixed milk replacer. For example, a suspendable concentrate can be manufactured by preparing a mixture which contains 62½ percent of tylosin phosphate, 25 percent of furazolidone, 10 percent of lactose, and 2½ percent of dodecylbenzenesulfonate. The mixture needs only to be thoroughly mixed and passed through a grinding mill to prepare it for use.

The art of making suspendable and suspended concentrates is very thoroughly known. The ordinary procedures for making such concentrates which are commonly used in the veterinary pharmaceutical art are entirely suitable for making concentrates of my combination of drugs.

My combination of drugs may be injected into the calves, or one drug may be injected while the other is administered oraly. It is usual to dissolve or suspend injectable drugs in the physiologically-acceptable solvents and buffers which are well known in the veterinary pharmaceutical art. Injectable suspensions, which will usually be used with my combination of drugs, employs a nonsolvent for the drug as a diluent. The nonsolvent can be, for example, a vegetable oil such as peanut oil, corn oil, or seasame oil, a glycol such as one of the polyethylene glycols, or water. Physiologically-acceptable adjuvants are necessary in order to keep the drugs suspended for injection. The adjuvants are chosen from among the same adjuvants which were discussed as adjuvants for liquid-feed suspensions.

All of the methods of administration discussed so far require daily administration of my combination of drugs. It is possible to administer the combination of drugs in ways which allow less frequent dosage. For example, it is possible to inject my drug in formulations which will sustain entry into the parts of the system where the drugs are active. Such formulations comprise the compounds dispersed in a matrix which will physically inhibit dissolution of the drugs. The matrix is injected into a part of the calf's body where it remains as a depot from which the drugs slowly dissolve. Matrtix formulations are now well known in the veterinary pharmaceutical art. They are formulated from waxy, hydrophobic semisolids such as vegetable waxes and high molecular weight polyethylene glycols.

Another way to sustain absorption of my drugs is to encapsulate in an implant. Such implants comprise a capsule or pellet with an outer wall of a physiologically-acceptable permeable membrane such as silicone rubber or silicone-containing plastics. The active compound is enclosed in the capsule or pellet and the capsule or pellet is surgically implanted in the animal. The physiological fluids of the animal slowly leach the drugs from the capsule or pellet. Such implants are designed to sustain the release of the drugs for any reasonable period. Variations in the formulation of the membranes and in the thickness of the membranes are used to vary the length of time over which the drugs become available.

It is also possible in the present state of the veterinary pharmaceutical art to administer my combination of drugs in an orally-administered bolus which releases the drugs over a sustained period of time. Such boluses are designed to remain stationary in the calf's rumen. The boluses are formulated in the same general way that tablets are formulated. However, sustained-action boluses are quite large and contain many days' dose of the combination of drugs. The boluses are weighed, as by metal filings, to cause the bolus to sink to the bottom of the rumen. The sustained action is obtained by incorporating a dissolution-delaying matrix in the formulation. The matrix is formed of insoluble or slightly-soluble material in which the drugs are embedded. Examples of useful materials which form such matrices are gums such as the methylcelluloses and the carboxypolymethylenes, the vegetable gums such as gum acacia, and partially cross-linked gelatin.

Formulation of my combination of drugs in dry calf feeds follows the usual procedures of feed additive formulation used in the art. It is necessary to prepare a dry or liquid drug premix. Such drug premixes are frequently formulated to contain from about 1 to about 400 g. of drug per pound of premix, depending on the desired concentrations in the feed. A premix may be based on a liquid solvent for the drugs or on an edible dry carrier such as coarsely ground grain, soybean meal, vermiculite, or an edible mineral such as diatomaceous earth.

In order to manufacture feeds from such drug premixes, it is necessary only to ascertain the amount of dry feed which the calves consume each day and to add to it the correct amount of drug premix. The feed is prepared for use simply by mixing the premix into the nutritive portions of the feed in any economically appropriate feed mixer.

It is also entirely possible to administer my combination of drugs to the calves in their dinking water. The same types of suspended, suspendable, or solution drug concentrates which are supplied for use in milk replacer may be mixed into drinking water. The grower need only determine the amount of water which the calves drink each day and mix in the water supply the proper amount of drug concentrate to provide the daily dose of drugs.

My combination of drugs may be administered to calves in the form of oral pharmaceutical dosage forms such as tablets, capsules, and drenches. Because of the labor required to administer such dosage forms, it is much more economically desirable to administer my drugs in the water or feed of the calves. However, if for some special reason oral dosage forms are desired, my combination of drugs is appropriate for formulation into such forms.

The preparation of tablets and capsules is now well known in the veterinary pharmaceutical art. Tablets are formulated by combining the drugs with the suitable lubricants, dispersants, and binders, and compressing the mixture. Capsules are formulated merely by filling an exactly determined amount of drug into gelatin capsules. Drenches comprise a simple solution or suspension of the combination of drugs in water. The same types of suspended or suspendable concentrates and concentrated solutions which have been earlier described are suitable for making drenches.

I claim:

1. A method of preventing or treating pneumoenteritis complex disease of calves which comprises the oral administration of from about 250 mg./calf/day to about 1,000 mg./calf/day of tylosin or a physiologically-acceptable salt thereof and from about 5 to about 100 mg./calf/day of furazolidone to the calves.

2. The method of claim 1 in which the calves are less than about 12 weeks old.

3. The method of claim 2 in which administration is in feed.

4. The method of claim 3 in which administration is in liquid feed.

5. The method of claim 4 in which administration is in milk replacer.

6. The method of claim 1 in which from about 250 mg./calf/day to about 500 mg./calf./day of tylosin or a physiologically-acceptable salt thereof and about 100 mg./calf/day of furazolidone are administered.

7. A calf feed composition which comprises a calf feed, furazolidone, and tylosin or a physiologically-acceptable salt thereof, the tylosin and furazolidone being present in an amount sufficient that a calf, consuming the calf feed composition, ingests each day from about 250 to about 1,000 mg. of tylosin or a physiologically-acceptable salt thereof and from about 5 to about 100 mg. of furazolidone.

8. The composition of claim 7 in which the feed is liquid.

9. The composition of claim 8 in which the feed is milk replacer.

10. The composition of claim 7 in which the tylosin or a physiologically-acceptable salt thereof and the furazolidone are present in amounts suffient that the calf ingests each day from about 250 mg. to about 500 mg. of tylosin or a physiologically-acceptable salt thereof and about 100 mg. of furazolidone.

References Cited

Chem. Abst., vol. 75 (1971) pp. 2757S and 4011S.

SAM ROSEN, Primary Examiner

U.S. Cl. X.R.

424—272

PO-1050
(5/69)

UNITED STATES PATENT OFFICE
CERTIFICATE OF CORRECTION

Patent No. 3,790,669                    Dated February 5, 1974.

Inventor(s) Charles Gale

It is certified that error appears in the above-identified patent and that. said Letters Patent are hereby corrected as shown below:

In column 3, line 34, "pneumoneteritis" should read --pneumoenteritis--.

In column 3, line 53, "sugar, oil, meat by-product," should read --sugars, oils, meat by-products,--.

In column 6, line 43, "EXAMPLE" should read --EXAMPLE 3--.

In column 6, the table at lines 50-55, the survival rate, percent for Furazolidone should read --62.5-- not "6.25".

In the table in columns 9 and 10, lines 40-50, the heading for the last column of data under 15 week should read --Conversion kg. gain/kg. feed-- not "Conversion, kg. grain/kg. feed".

In column 13, line 39, "weighed" should read --weighted---.

In column 14, line 57, "suffient" should read --sufficient--.

Signed and sealed this 13th day of August 1974.

(SEAL)
Attest:

McCOY M. GIBSON, JR.         C. MARSHALL DANN
Attesting Officer            Commissioner of Patents